Sept. 4, 1956     C. O. GRAVES ET AL     2,761,196
FACE MILL

Filed July 23, 1952     2 Sheets-Sheet 1

INVENTORS.
CARL O. GRAVES.
HANS ERNST
BY H. K. Parsons & L. W. Wright,
ATTORNEYS.

Sept. 4, 1956 C. O. GRAVES ET AL 2,761,196
FACE MILL
Filed July 23, 1952 2 Sheets-Sheet 2
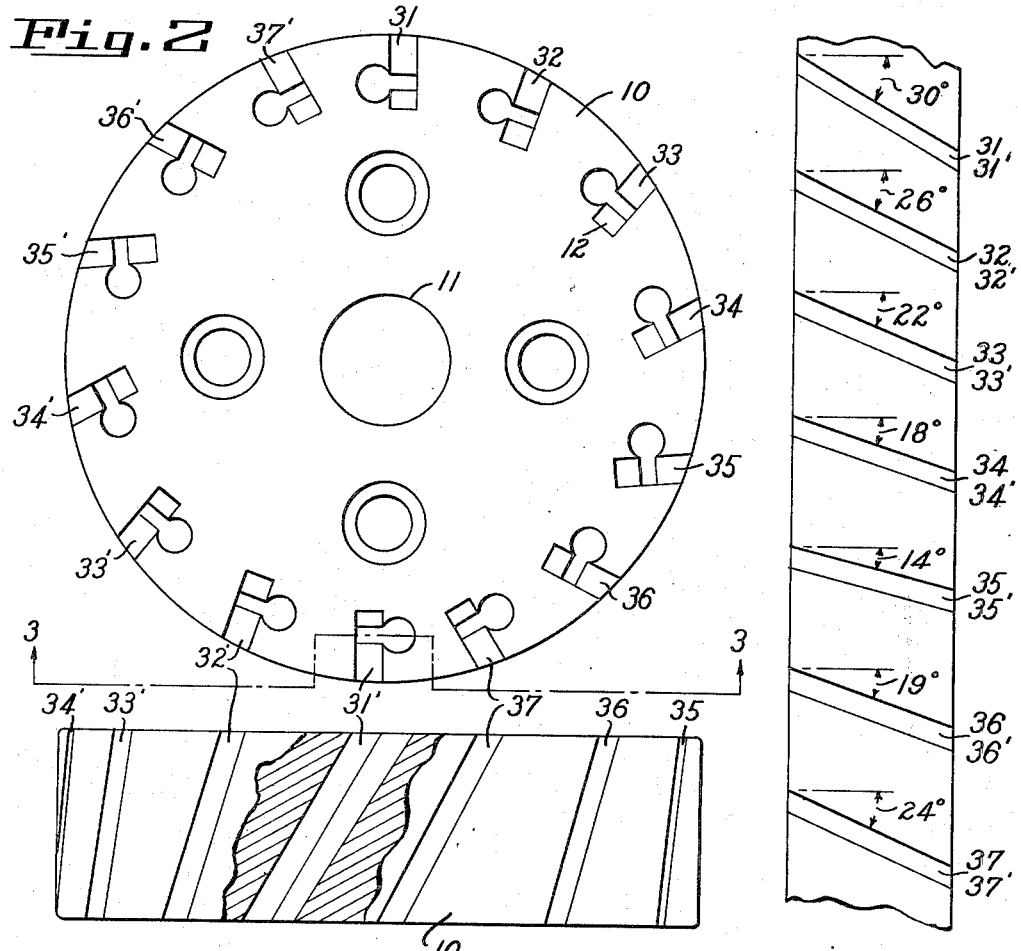
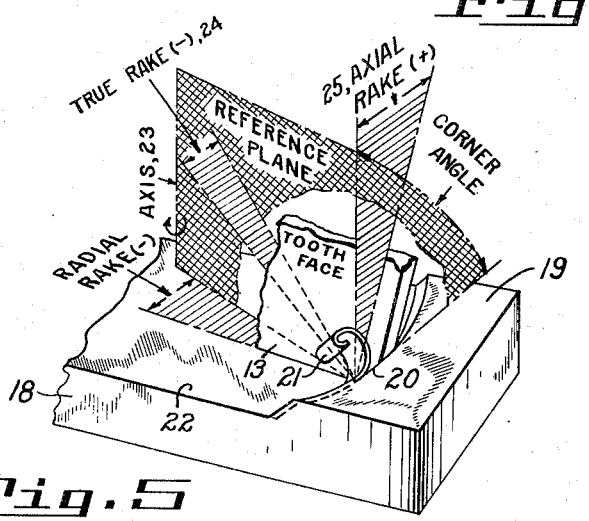
INVENTORS.
CARL O. GRAVES.
HANS ERNST
BY
ATTORNEYS.

2,761,196
Patented Sept. 4, 1956

United States Patent Office

2,761,196
FACE MILL

Carl O. Graves, Norwood, and Hans Ernst, Cincinnati, Ohio, assignors to The Cincinnati Milling Machine Co., Cincinnati, Ohio, a corporation of Ohio Application July 23, 1952, Serial No. 300,476

9 Claims. (Cl. 29—105)

This invention relates to the formation of metal or similar work pieces by removal of stock therefrom by employment of a rotary cutter of the type of operation normally characterized as face milling. In performance of such milling operations and particularly with present-day high speed production requirements, it is desired to employ high speed cutter rotation combined with maximum rate of feed and depth of cut compatible with the capacity of the milling machine. Frequently, however, the rate of production cutting or stock removal is limited by the development of undue vibration or chatter. Chatter is objectionable because it mars the finish, thus reducing the commercial value of the machined part, and it also shortens the life of the cutter and the machine, making it commercially unprofitable to use the highest feeds and speeds which considerations of power and heating of the cutter would otherwise permit. Various attempts have been made to eliminate this chatter condition by provision of vibration dampening mechanisms, special machine bracings, and the like, but with only limited success.

It is, therefore, a prime object of the present invention to provide a type of face milling cutter structure which will be effective to minimize chatter creating conditions at their source and thus make possible more efficient work production, both as to possible stock removal and improvement of final surface while increasing the life and efficiency of the machine on which the milling operation is performed.

The present invention further relates to a new principle of chatter elimination which can be incorporated in the design of the cutter body while utilizing standard type cutter teeth.

In employing the principles of this invention to eliminate chatter, as more fully set forth in the following description, it has been found that its use has resulted in increased production and cutter life to a degree greatly exceeding that which could be expected by one skilled in the art.

Figure 2 is a face view of the cutter body.

Figure 3 is an edge view of the cutter body with a portion broken away.

Figure 4 is a development of the cutter body periphery illustrating the various axial rake angles.

Figure 5 is a perspective diagram illustrating and identifying the angular relationships of a cutter tooth with respect to the cutter body and workpiece.

Figure 1:
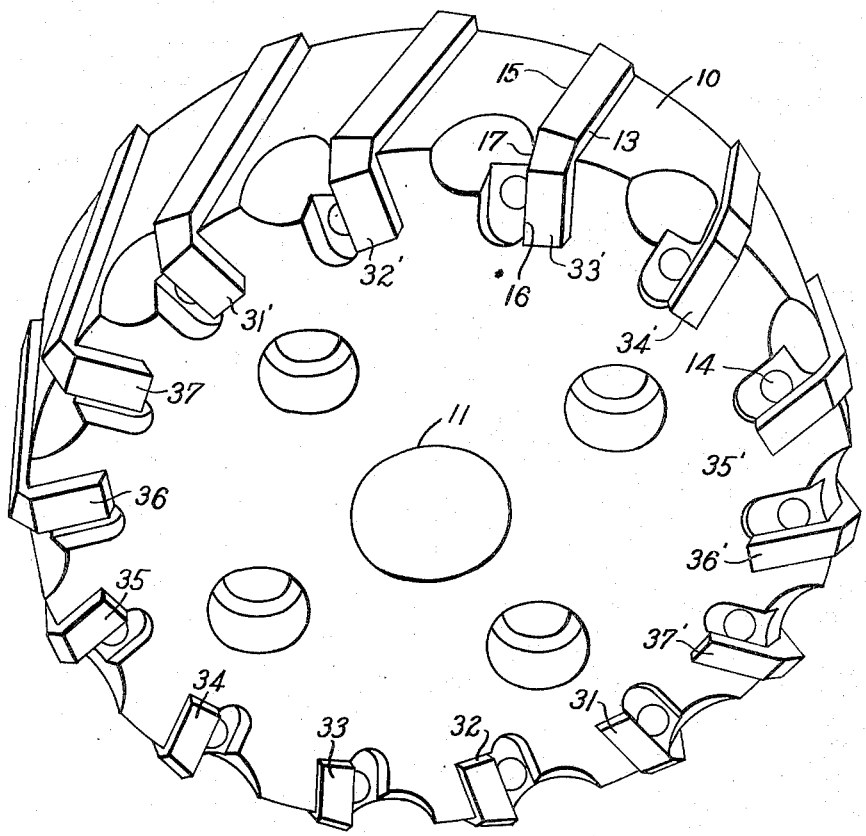
Figure 1 is a perspective view of a cutter embodying the present invention.

Chatter in a milling operation may be defined as a self-energizing or regenerative vibration which builds up in intensity when once started. In the general case, sustained resonant vibratory movements in any physical system are caused by the action of a periodically modulated exciting force upon an elastically supported mass. The vibrating mass, when acted upon by the successive pulses of the modulated force, is driven through increasingly wide excursions until equilibrium is established between energy input and energy absorption. In the case of a milling cutter, the cutter and its supporting elements constitute the mass which is acted upon, and the cutting force is the exciting force. Insofar as cutter design is concerned, the problem is to insure that the cutting force is kept as steady and free from modulation as possible.

In order to visualize how chatter originates, let us assume that a particular cutting edge of the milling cutter which contacts the work does not chatter but follows closely its prescribed path and generates a new surface on the work piece. However, the surface formed will not be a geometrically perfect surface because many sources of vibration are always present: some external to the machine, some from gears and rotating parts of the machine itself, and some from the original tooth impacts and discontinuities in cutting action during the process of chip formation. Such shocks as are sustained by the cutter from any of these sources will cause minute deflections of its supporting system and therefore departures in the machined surface from the true geometrical form. Thus, every movement of the cutter out of its proper position leaves a ridge or a valley on the work surface wherever a cutting edge is in contact with it. With a conventional cutter, all the cutting edges having the same angle; thus all the ridges will be parallel. Furthermore, each displacement of the cutter or its supporting system will not only cause one wave to appear on the contacting surface, but, because the cutter is part of a massive elastic system which is not critically damped, the original wave will be followed by a train of attenuated waves. Since these following waves are the result of free vibrations of the system, they will be roughly sinusoidal and their wavelength will be determined by the natural frequency of some particular mode of vibration of the supporting system for the cutter or work. Because the tooth impact frequencies normally encountered are much lower than these natural frequencies, we find trains of parallel waves corresponding in wavelength to a particular natural frequency of the cutter, or of the supporting system for the cutter or work, spread across the freshly cut surface at the time the next succeeding cutting edge contacts the work.

The thickness of the chip cut by the succeeding cutter tooth will now be modulated at the natural or resonant frequency of the system. Since the cutting force is a function of the instantaneous chip thickness and cutting speed, it will be similarly modulated. The cutter is therefore now being driven into oscillation by the waves which it has itself produced. Thus, we have the mechanism for a continuous oscillation. The energy to sustain and even increase the oscillation is provided by the inherent instability of the cutting action due to non-linearity of the cutting force with respect to both chip thickness and cutter speed.

As chatter builds up, there is a simultaneous building up of the pattern of parallel ridges and valleys on the work. When the chatter has reached a state of equilibrium with a multi-tooth cutter we have observed that the wave length of the undulations on the freshly cut surface of the work is an exact sub-multiple of the tooth space of the cutter. This can be established by suddenly stopping the machine during a chattering cut. This observation furnishes additional proof that the building up of a regular pattern of parallel ridges and valleys on the work, which drive the machine into resonant vibration, requires the passage of several parallel cutting edges in accurately timed sequence.

In essence, therefore, during a chattering cut the cutter and work-piece, together with their driving and supporting members, constitute a dynamic system undergoing sustained resonant oscillation. The pattern of undulations on the work surface is an essential part of the feed back mechanism in the resonant dynamic system. The purpose of this invention is to interfere with the operation of this feed back mechanism, and thus oppose the resonant oscillation.

By employment of the present cutter structure, the building up of a disadvantageous free oscillation or resonant vibration has been prevented.

One embodiment of the present invention has been shown in the drawings, which reproduce the features present in an 8" diameter, 14 tooth, inserted tooth face mill. In such a mill, the metal removal, as indicated in Figures 5 and 6 is accomplished almost entirely by the corner angle or edge, whose effective engagement with the work is determined not only by the actual angle of the tooth but by its position as determined by the radial and axial rake angles of the tooth positioning surface of its receiving slot in the cutter body.

The complete cutter embodying the present invention is shown in Figure 1 of the drawings and comprises a body portion 10 of generally cylindrical disc-like form having the axial aperture 11 to receive the cutter spindle and having a plurality of slots designated as an entirety by the numeral 12 to receive the cutting teeth or blades 13. These blades are secured in position within the slots by conventional wedges or locking devices 14.

It is contemplated that the prime features of the present invention are built into the body portion of the cutter and that conventional cutting teeth 13 may be interchangeably mounted in the several slots of the body portion. These teeth include the axially extending cutting edges 15 and face cutting edges 16 which may be connected by the intermediate beveled or angularly disposed corner portions 17. When such teeth are mounted and ground in position in the cutter they project both radially and in one direction axially from the cutter body and their beveled corner portions define a frusto-conical cutting surface coaxial with the body portion.

Figure 6:
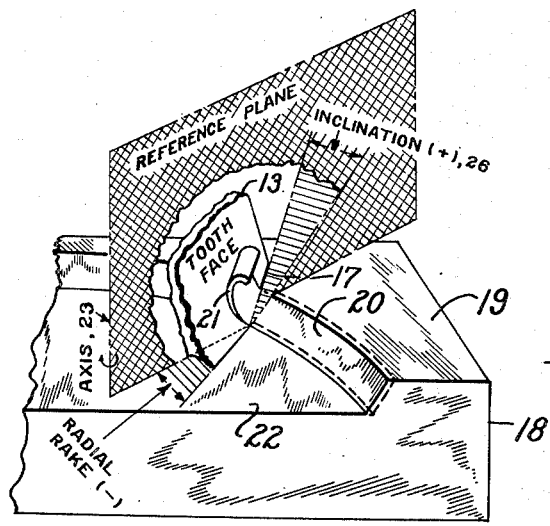
Figure 6 is a corresponding diagram viewing the cutter tooth and workpiece from a different angle.

As the angular relationships of the mounting of the teeth in the body portion are of the essence of the present invention the several angles involved and their relationship to the workpiece have been diagrammatically illustrated in Figures 5 and 6. As there shown, the workpiece 18 has the primary surface 19 which is being arcuately cut away as indicated at 20 primarily by the cutting portion 17 of a tooth 13, producing the chip 21 and the resultant new surface 22 on the work. 23 designates the axis of the cutter or cutter body, and it will be noted that the tooth 13 is shown disposed at a negative true rake angle 24 as emphasized by the shaded wedge so designated in Figures 5 and 6 and is additionally disposed at a positive axial rake angle as indicated by the shaded wedge 25 in Figure 5. The combined tilted positioning effect on the tooth 13 by virtue of the selected radial and axial rake angles determines the effective inclination 26 of the beveled cutting corner 17 of an individual tooth, as will be well understood by those skilled in the art.

In prior art face mill cutters, however, it has been customary to have all of the teeth 13 correspondingly arranged and operating, that is to say, the various teeth of a particular cutter have been mounted in the supporting body at a uniform radial rake angle and at a uniform axial rake angle, resulting in the production of resonant vibrations or chatter during many machining operations.

As distinguished from this conventional structure and arrangement, in the present invention the cutter is preferably provided with an even number of tooth receiving slots, each slot having a diametrically opposite counterpart, but circumferentially of the cutter the slots are located in groups or series in which either the radial rake angles or the axial rake angles or both of successive individual teeth vary incrementally from tooth to tooth to prevent the building up of a chatter pattern by the cutter portions of the teeth and thus prevent development of resonant vibrations in the machine during a cutting operation. For most efficient cutting with elimination of this periodic engagement of successive teeth, it has been found desirable to vary the tooth spacing in a series of initial incremental and subsequent decremental steps, the teeth being arranged with counterparts at diametrically opposite points on the body portion, thus forming successive series for engagement with the work upon rotation of the cutter. Furthermore, as providing basic reference points at one diametrical location the slots in the body portion may advantageously be so formed that the teeth mounted in these slots will be disposed at a zero radial rake angle.

In the particular embodiment of the invention shown in the drawings the several particular angular relationships selected have been indicated in the following table, reference being made to Figures 5 and 6 for identification of the particular angles involved, which it will be noted are structurally shown respectively in Figures 2, 3 and 4 of the drawings.

*Cutting angles with inserted teeth finish ground*

| Tooth Number | Rake Angle | | | Angle of Inclination |
|---|---|---|---|---|
| | Radial | Axial | True | |
| 31 and 31'  | 0  | 30 | 22.5 | plus 22.5. |
| 32 and 32'  | 5  | 26 | 22.5 | plus 16. |
| 33 and 33'  | 10 | 22 | 22.5 | plus 9. |
| 34 and 34'  | 15 | 18 | 22.5 | plus 2.5. |
| 35 and 35'  | 20 | 14 | 23.0 | minus 5. |
| 36 and 36'  | 14 | 19 | 22.5 | plus 4. |
| 37 and 37'  | 7  | 24 | 22.0 | plus 13. |

In addition to the variable angles at which the cutting edges of the individual teeth are disposed, their pitch or interdental peripheral spacing is varied similarly. Taking the average tooth spacing as 1/14 of the perimeter or 1.7953" and calling this 100%, then the tooth space immediately preceding each numbered tooth is given in percentage of the average as follows:

| Tooth Number | Tooth Space Preceding each Tooth in Percentage of the Average Space, degrees |
|---|---|
| 31 and 31' | 95 |
| 32 and 32' | 98 |
| 33 and 33' | 99 |
| 34 and 34' | 103 |
| 35 and 35' | 106 |
| 36 and 36' | 101 |
| 37 and 37' | 98 |

The axial rake (which is also the inclination of the peripheral edge) varies between 30 degrees and 14 degrees. The radial rake (which is also the inclination of the face cutting edges) varies from zero to 20 degrees and can range both ways from zero.

Attention is invited to the fact that in the embodiment shown, the design is such that standard commercial cutter bits or inserted teeth can be employed and that the new features of the cutter are designed into the body and do not depend upon special shaped cutter teeth or special methods of sharpening.

Various comparative cutting tests made under similar conditions employing standard face mills as contrasted with face mills of the present invention emphasize that more than twice the depth of cut can be taken with the cutter of the present invention without chatter than can be taken with the comparative conventional face milling cutters. In other words, the present improvement cutter has a capacity of at least two to one ratio of metal removal for a given feed per tooth as compared with the regular commercially known face mills.

What is claimed is:

1. A face mill cutter comprising a body portion, and an even number of cutting teeth radially projecting therefrom having beveled corner portions defining a frusto-conical cutting cutting surface co-axial with the body portion, diametrically opposite cutting teeth being correspondingly positioned as respects the body portion, the radial rake and axial rake angles of a successive series of individual teeth varying incrementally from tooth to tooth in a non-repetitive sequence of angles to prevent development of resonant vibrations during cutting.

2. A face mill cutter comprising a body portion, and an even number of cutting teeth radially projecting therefrom having beveled corner portions defining a frusto-conical cutting surface co-axial with the body portion, diametrically opposite cutting teeth being correspondingly positioned as respects the body portion, the radial rake and axial rake angles of the successive teeth inversely varying from tooth to tooth in a non-repetitive sequence of angles to maintain the effective rake angle of engagement of all teeth substantially constant but non-periodic as respects engagement with a workpiece during milling.

3. A face mill cutter comprising a body portion, and an even number of cutting teeth radially projecting therefrom having beveled corner portions defining a frusto-conical cutting surface co-axial with the body portion, diametrically opposite cutting teeth being correspondingly positioned as respects the body portion, the radial rake and axial rake angles and interdental spacing of an intermediate series of successive individual teeth varying incrementally by non-repetive amounts from tooth to tooth to prevent development of resonant vibrations during cutting.

4. A cutter body for an inserted blade face mill of the type having a multiple number of inserted blades with beveled corners jointly forming a frusto-conical cutting surface, said cutter body having an annular series of blade positioning slots formed therein, said slots varying in a progression from one to another as respects both the radial and axial rake angles to provide seats for supporting the various blades in a series each in a different angular position but with substantially equal effective rake angles at the beveled corners.

5. A cutter body for an inserted blade face mill of the type having a multiple number of inserted blades with beveled corners jointly forming a frusto-conical cutting surface, said cutter body having an annular series of blade positioning slots formed therein, said slots varying in a progression from one to another as respects both the radial and axial rake angles to provide seats for supporting the various blades in a series each in a different angular position but with substantially equal effective rake angles at the beveled corners, the axial rake angles of said slots varying inversely as respects the variation of the radial rake angles of the slots.

6. A cutter body for an inserted blade face mill of the type having a multiple number of inserted blades with beveled corners jointly forming a frusto-conical cutting surface, said cutter body having an annular series of blade positioning slots formed therein, said slots varying in a progression from one to another as respects both the radial and axial rake angles to provide seats for supporting the various blades in a series each in a different angular position but with substantially equal effective rake angles at the beveled corners, and cutter teeth mounted in said slots having their radial and axial angles determined by the slots and having their corner angles of inclination varying in a progression from tooth to tooth in correspondence with the variations in the axial rake angles.

7. A face milling cutter comprising a body portion supporting an annular series of cutting teeth having beveled corner portions defining a frusto-conical cutting surface co-axial with the body portion, said teeth including similar diametrically opposed cutting teeth and a series of teeth disposed circumferentially of the body portion intermediate said diametrically opposite teeth, the radial angles of said series of the teeth being negative and varying from tooth to tooth by an initial progression of decreasing and a subsequent progression of increasing angles, and the rake angles of said individual teeth in the series being varied from tooth to tooth in an inverse progression as respects the radial angles to maintain the true rake angle of the several teeth at said frusto-conical cutting surface substantially constant.

8. A cutter as specified in claim 7 in which the interdental spacing of the teeth in said series at said cutting surface is varied from tooth to tooth to prevent periodic engagement of a succession of teeth with a work piece during the machining operation.

9. A cutter as specified in claim 8 and in which said interdental spacing is greatest at an intermediate point in the series and progressively decreases toward the termini of the series.

References Cited in the file of this patent

UNITED STATES PATENTS

| 725,374 | Shaw | Apr. 14, 1903 |
| 1,988,770 | Alexander | Jan. 22, 1935 |
| 2,081,639 | Perry | May 25, 1937 |
| 2,328,494 | Reaney | Aug. 31, 1943 |
| 2,367,221 | Kraus | Jan. 16, 1945 |
| 2,528,300 | Degner | Oct. 31, 1950 |

FOREIGN PATENTS

| 597,438 | Great Britain | Jan. 26, 1948 |